June 25, 1946. D. K. ALLISON 2,402,585
FLUID METER
Filed June 26, 1942 2 Sheets-Sheet 2

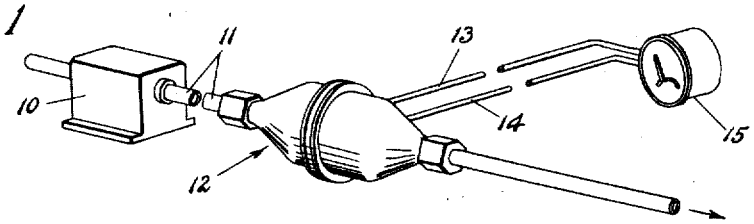
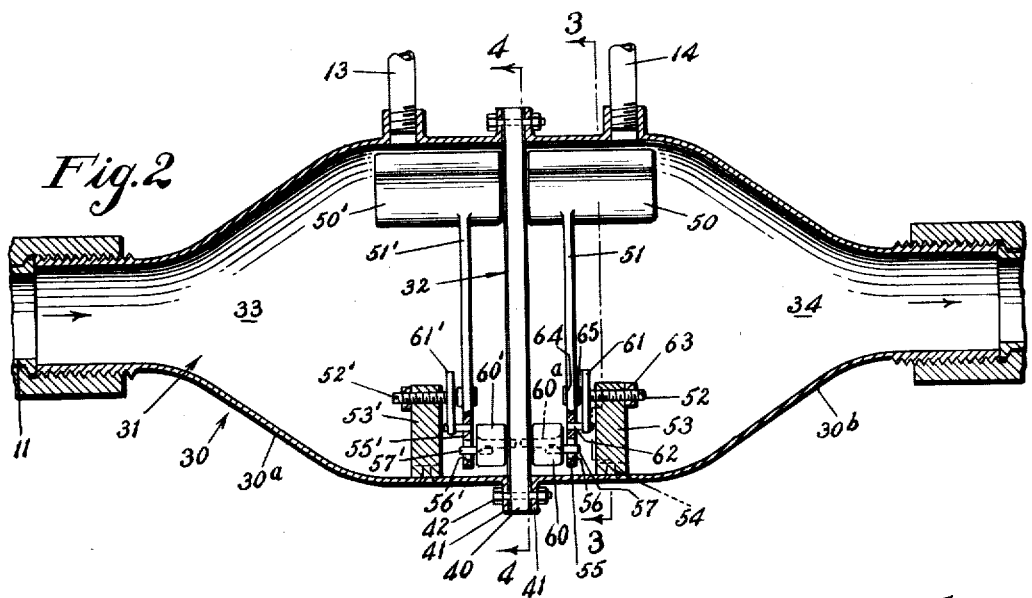

INVENTOR,
DONALD K. ALLISON
By HARRIS, KIECH, FOSTER & HARRIS.
Clarence F. Kiech
FOR THE FIRM
ATTORNEYS.

Patented June 25, 1946

2,402,585

UNITED STATES PATENT OFFICE 2,402,585

FLUID METER

Donald K. Allison, Beverly Hills, Calif.

Application June 26, 1942, Serial No. 448,674

16 Claims. (Cl. 73—207)

My invention relates to fluid meters and, more particularly, to a metering system for measuring the mass flow of a fluid. It will be exemplified with reference to a mass-flow fuel meter for indicating the instantaneous fuel consumption of an airplane engine, without intent to limit the invention thereto.

Fuel consumption of an airplane engine is rated on a weight basis, most engines requiring about 0.5–0.55 pound of gasoline per horsepower hour. Ratings on the basis of weight of fuel rather than gallonage of fuel are employed because a pound of gasoline, for instance, contains a fixed and definite power or work content, whereas a gallon of gasoline varies in this connection throughout a relatively wide range, depending upon the specific gravity thereof. For instance, a gallon of gasoline having a specific gravity of 0.760 contains 6.33 lbs. of gasoline, whereas, at a specific gravity of 0.680, a gallon of gasoline will contain only 5.66 lbs. of fuel, a difference of two-thirds pound of fuel per gallon, or more than 10% difference in actual power content.

Specific gravity is affected not only by composition of the fuel but, to a marked extent, by the temperature of the fuel. Thus, 2000 gallons of gasoline measured into airplane tanks at a ground temperature of 85° F. will diminish in volume by 49 gallons when at 50° F. aloft, by 70 gallons at 35° F., and by approximately 120 gallons at 0° F.

In the operation of tactical airplanes, it has been found that the effective range of operation of the airplane, and the efficiency of such operation, can be substantially increased if the pilot and navigator can be supplied with an accurate indication of the rate of consumption of fuel in pounds per hour. The use of conventional tank gauges and fuel flow meters can give only approximate knowledge as to work content or minutes of flight in view of the effects of change in specific gravity as noted above. In such conventional systems, it is impossible to obtain maximum efficiency in the operation of the engine without continually taking observations of the specific gravity of the fuel and correlating these values with the gallonage flow meter, an operation which is laborious, inaccurate, and usually impractical under active flying conditions.

It is an object of the present invention to provide a mass-flow meter for measuring accurately the flow of fuel or other fluid in terms of pounds per minute or hour.

Another object of the invention is to provide a mass-flow meter providing passage portions of different diameter to produce a differential velocity of fluid flow and a differential pressure as between these portions, and to vary the size of one of the passage portions with respect to the other in response to changes in density or specific gravity of the fluid.

It is another object of the invention to provide a mass-flow metering system employing a restricted orifice means in the path of flow of the fluid to establish a pressure differential, and to vary the size of the orifice means as a function of the density or specific gravity of the fluid and in such manner as to develop a pressure differential substantially proportional to the mass flow of fluid, this differential pressure being used to give an indication of the weight of fluid flow per unit of time.

A further object of the invention is to employ one or more floats which are at least partially submerged in the fluid and the buoyancy of which varies with the density or specific gravity of the fluid, and to operatively connect such float or floats to a fluid metering system to compensate for changes in density or specific gravity and give an indication of mass flow per unit of time.

Other objects of the invention include the provision of a mass-flow meter which is simple and relatively inexpensive, and which is of light weight, yet very accurate and substantially immune to accelerating or decelerating forces applied to the meter.

Further objects and advantages of the invention will be apparent to those skilled in the art from a consideration of the following exemplary description of several embodiments of the invention.

Referring to the drawings:

Figure 1 is a utility view showing the mode of connection of the mass-flow meter in a fuel line;

Figure 2 is a horizontal sectional view of the control unit of the mass-flow meter;

Figure 3 is a vertical sectional view, taken along the line 3—3 of Figure 2;

Figure 5 is a face view, partially in section, of the indicating means;

Figure 11:
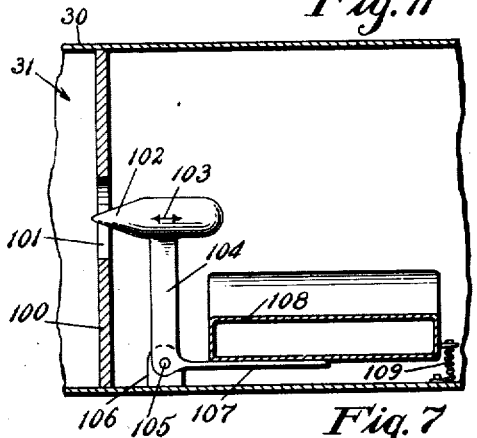
Figure 8:
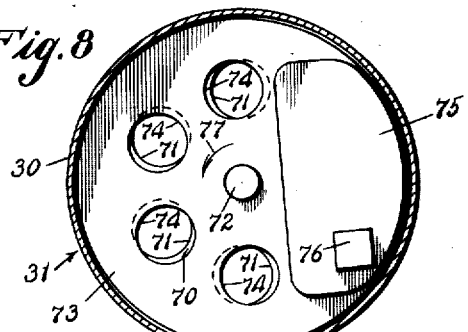
Figure 7:
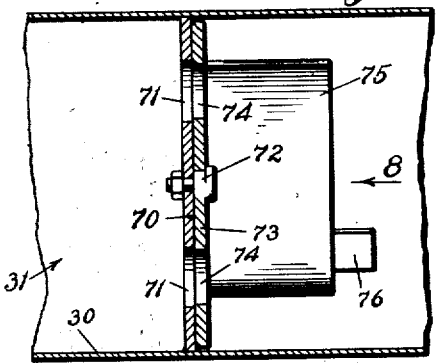
Figure 10:
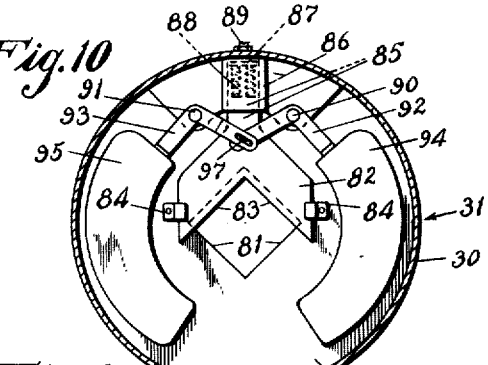
Figure 9:
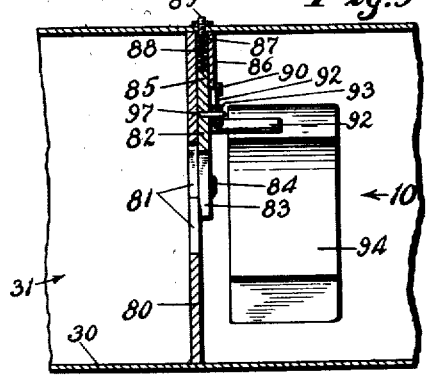

Figures 7 and 8 diagrammatically illustrate an alternative form of orifice means, Figure 8 being taken as indicated by the arrow 8 of Figure 7;

Figures 9 and 10 show diagrammatically another alternative orifice means, Figure 10 being taken as indicated by the arrow 10 of Figure 9; and Figure 11 is a diagrammatic vertical sectional view of still another orifice means which can be employed in the invention.

Referring particularly to Figure 1, which shows the disposition of the mass-flow meter when employed with an internal combustion engine, for example an airplane engine, the conventional fuel pump and fuel line are respectively indicated by the numerals 10 and 11, this fuel line leading to the carburetor of the engine. Interposed in this fuel line is a control unit 12 of the invention, from which extend two differential pressure lines 13 and 14 terminating at an indicating means 15, the details of which are best shown in Figure 5. The function of the control unit 12 is to produce a pressure differential which varies substantially proportionally with the mass flow of fluid (in this instance, liquid fuel). The function of the indicating means 15 is to receive this differential pressure and translate it into a visible indication. It may be a conventional differential pressure gauge, such as shown in Figure 5, in which the two pressures are conducted by lines 13 and 14 to closed bellows 16 and 17 interconnected by a rod 18. This rod carries a pin 19 extending in an elongated opening 20 of a member 21 pivoted at 22. A gear sector 23 is carried by this member 21 and its oscillation turns a pinion 24, to which is connected a hand 25 moving with respect to a scale 26 which, in this instance, is calibrated in pounds of gasoline per hour.

The details of the control unit 12 are best shown in Figure 2 as including a body 30 providing a passage 31 through which the fuel flows. The body 30 is preferably formed of two sections 30a and 30b, respectively connected to sections of the fuel line by suitable couplings, as shown in Figure 1. Between these sections is positioned an orifice means 32 dividing the passage 31 into chambers 33 and 34 and providing a restricted orifice 35 which is adjustable in size. The flow of fuel from the chamber 33 through the orifice 35 and to the chamber 34 establishes a pressure difference as between the chambers 33 and 34, this pressure differential being transmitted by the lines 13 and 14 to the indicating means 15.

Figure 6:
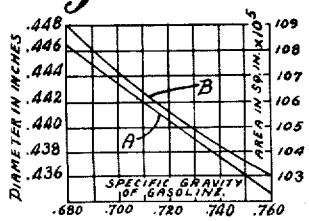
Figure 6 is a graphical representation of the degree to which the orifice area should be changed to compensate for fluids of different specific gravity.

The orifice 35 is preferably of the "thin-plate" type, though made adjustable for the purpose of the present invention. It is known that a thin-plate orifice is one of the most accurate methods for measurement of fluid flow. However, it is responsive only to volume rate of flow according to the formula:

$$Q = C \times A \times \sqrt{2gh}$$

where:

Q is flow in cubic feet per second, C is a constant, A is the area of the orifice in square feet, $g = 32.174$, and $h$ is the pressure differential across the orifice in feet of water. The present invention contemplates enlargement or contraction of the orifice in accordance with changes in density or specific gravity of the fuel to change its area A in such manner that the differential pressure $h$ is responsive to the product of volume and specific gravity, thus obtaining a differential pressure which varies with the mass rate of flow of the fluid to permit reading of this flow on the indicating means 15. The necessary change in area of the orifice is usually relatively small and the curves of Figure 6 give typical dimensions of such an orifice to produce pressure differentials proportional to the square of mass flow for fuel in the specific gravity range of 0.680 to 0.760 and for a maximum differential of 28.9 ounces for a flow rate of 2000 lbs. of fuel per hour. Curve A is plotted to show the relationship between diameter and specific gravity of gasoline, while curve B is plotted to show the relationship between area of the orifice and such specific gravity. If we consider a range of specific gravity from 0.68 to 0.76, the system for which these curves were calculated would require an orifice diameter of 0.4465 inch and 0.4345 inch, respectively, for these two conditions, a total change in diameter of 0.012 inch.

Figure 4:
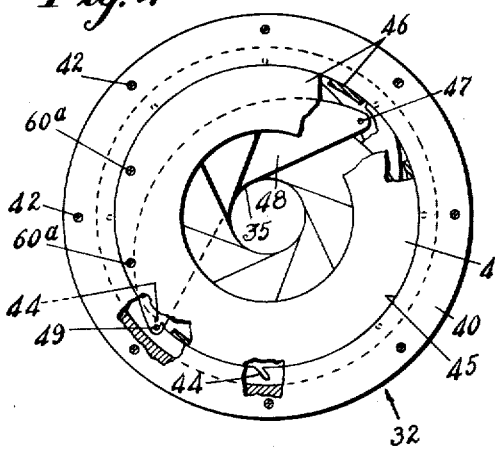
Figure 4 is a vertical sectional view, taken substantially along the line 4—4 of Figure 2, and showing diagrammatically the preferred construction of the iris diaphragm.

The invention comprehends a suitable means responsive to density or specific gravity of the fluid which, in the preferred embodiment, comprises one or more floats which are partially or completely submerged in the fluid, together with means for changing the size of the orifice 35 through operative connection with the means responsive to density or specific gravity. One arrangement which has been found particularly useful is illustrated in Figures 2, 3, and 4, in which the orifice means is shown as of the iris diaphragm type. While conventional iris diaphragms can be employed in this connection, I prefer to use the embodiment suggested in Figure 4.

Referring particularly to Figure 4, the orifice means 32 includes generally an outer ring 40, which, as suggested in Figure 2, may be clamped between flanges 41 of the body sections 30a and 30b by use of suitable bolts 42. This outer ring provides a plurality of elongated openings 44 equally spaced around the periphery and these openings can, if desired, extend to and open on the inner periphery 45 of the outer ring. Journalled by and positioned within the outer ring 40 is an inner ring 46 capable of turning through a small angle to adjust the size of the orifice 35. This inner ring 46 carries a plurality of pins 47 spaced equally from each other and corresponding in number to the elongated openings 44. A corresponding number of iris blades 48 are provided, one end of each blade providing an opening for receiving one of the pins 47 of the inner ring 46, and the other end providing a small pin 49 slidable in one of the elongated openings 44. This provides for pivoting opposite ends of each iris blade at different radial distances from the center of the orifice 35, whereby a small degree of rotation of the inner ring 46 with respect to the outer ring 40 will cause the iris blades to open or close slightly, these blades providing curved surfaces cooperating in outlining and providing different peripheral segments of the orifice 35. It will be understood, however, that various types of iris diaphragm structures can be used as the orifice means of the present invention, though the construction suggested in Figure 4 is preferred as retaining the iris blades at opposite ends to prevent substantial deflection in the direction of fluid flow through the resulting orifice 35.

Referring particularly to Figures 2 and 3, a float 50 is disposed in the chamber 34 to one side thereof. Being submerged in the fuel, its buoyancy varies with the specific gravity of this fuel. This float is connected to a ring 51 journalled on a pin 52 fixed in a block 53 secured by screws 54 to the body section 30b. Carried by the ring 51 is an arm 55 providing an elongated opening 56 receiving a pin 57 which is operatively connected to the inner ring 46 of the orifice means to change the position of this inner ring with respect to the outer ring 40 and thus adjust the size of the orifice 35. In the illustrated embodiment, the pin 57 is carried by a counterweight 50 which, in turn, is connected by screws 60a to the inner ring 46.

The float 50 may be formed of any material having a lower density than the fuel so as to be buoyant, though it is preferred to form this float of hollow construction, employing a thin metal shell defining the enclosed space. To make the float responsive to changes in specific gravity, it is desirable that a counterbalance means be provided. The counterbalancing weight 60 serves in this capacity and, if desired, may be designed to produce a turning moment about the pin 52 equal and opposite to that produced by the weight of the float 50 and the ring 51, or the design may be such as to only partially counterbalance this weight.

In addition to the counterbalancing weight 60, I prefer to employ a small spiral spring 61 to exert a small resilient force biasing the float 50 in one direction, usually in a direction tending to depress or lower same. This small spiral spring is disposed around the pin 52 between the block 53 and the ring 51. One end of this spring is connected to the arm 55 by a pin 62 and the other end is fixed to the pin 52 which, in turn, is preferably adjustable in angular position with respect to the block 53 so as to permit adjustment of the turning moment exerted by the spring. This may be accomplished by threading the pin 52 throughout that portion of its length extending through the block 53, slotting the outer end of this pin and providing a lock nut 63 for locking the pin 52 in a desired angular position determined by turning a screw driver inserted in the slot thereof. The ring 51 should be freely rotatable on the pin 52 and, to accomplish this, the pin 52 may provide a head 64 and a flange 65 spaced from each other to receive the ring 51 and provide a slight clearance to insure a free pivotal connection.

A complementary structure is provided in the chamber 33, being indicated by corresponding primed numerals, to provide an additional buoyant force aiding in the turning of the inner ring 46 and, correspondingly, the adjustment in size of the orifice 35. This complementary structure can be eliminated in certain instances if sufficient actuating force is obtained from the float 50 and its connected mechanism.

In the design of this system, it is of some importance to observe certain relationships if an instrument of high accuracy is to be obtained, and among these are the following. The desired change in diameter of the orifice 35 may not always be strictly linear with respect to changes in specific gravity. Correspondingly, the mechanism should be designed to produce the desired non-linear variation. In this connection, the illustrated system provides several expedients whereby non-linearity may be obtained. In the first place, the buoyant force on the float 50 is always upward and the resulting turning moment about the pin 52 will vary slightly with change in vertical position of the float, due to a slight change in lever arm. In the second place, the counter-balancing action of the counterbalance weight 60 will also vary depending upon the position of this weight with respect to the horizontal mid-sectional plane of Figure 3. If the center of gravity of this counterbalance weight is in this plane, the counterbalancing effect will be substantially linear. On the other hand, if the center of gravity of this counterbalance weight is substantially removed from this plane, the counterbalancing action will be changed and the degree of counterbalance at different angular positions of the inner ring 46 will be modified. In the third place, the spring 61 need not necessarily exert a moment which is strictly linear with respect to angular movement of the arm 55 about the pin 52 as such a spring exerts an increasing moment if the outer end is turned in a direction to tighten the spring. In the fourth place, non-linear relationships may be introduced by the design of the iris diaphragm. For example, the elongated openings 44 can be of arcuate shape so as to give the desired change in diameter of the orifice 35 in response to a given motion of the float 50. Keeping these factors in mind, it is not difficult to design a system in which the pressure differential in the chambers 33 and 34 varies in response to mass flow of fluid.

The mode of operation of this embodiment of the mass-flow meter is as follows. Assuming that a fuel of given specific gravity is flowing through the control unit, it will be apparent that the pressure differential across the orifice means 32 will be proportional to the square of the volume rate of flow. If, now, the volume rate of flow is maintained constant and the specific gravity of the fuel increases, this increases the buoyancy of the counterbalanced floats and these floats move upward against the spring pressure. This upward movement of the floats will operate to reduce the area of the orifice 35 slightly and thereby increase the pressure differential across the orifice by an amount proportional to the increased specific gravity of the fuel. Should the specific gravity of the fuel decrease for any reason, the buoyancy of the floats will be diminished proportionately and they will move toward a lower position, thereby slightly increasing the area of the orifice and thereby slightly decreasing the differential pressure. It will be apparent that the control unit is not responsive to acceleration or deceleration thereof and that it is not detrimentally affected by vibration, particularly as the operating mechanism is surrounded by fuel so that such vibrations tend to be damped by this fuel.

While an iris-diaphragm type of orifice has been shown in the preferred embodiment, it should be understood that the invention is not limited thereto and that other types of variable-sized orifices can be used so long as the orifice size is properly correlated with density or specific gravity. For example, in Figures 7 and 8 is shown diagrammatically an alternative system in which a plate 70 is secured to the body 30 in the passage 31. This plate is shown as including four openings 71 for restricting the fluid flow and developing the pressure differential. Pivotally mounted on a pin 72, carried centrally by the plate 70, is a control plate 73 providing four openings 74 which are registrable with the openings 71. Operatively connected to the control plate 73, either directly or by a linkage, e. g., similar to that shown in Figure 3, is a float 75 which is partially or completely submerged in the fluid, complete submergence being preferred. A counterbalance weight 76 is shown as attached to the float to bias the control plate 73 toward open orifice position. The buoyancy of this float will vary with changes in density or specific gravity of the fluid. Upon increase in specific gravity, for example, the float 75 will rise and turn the control plate 73 in the direction of the arrow 77 to further disalign the openings 71 and 74 and thus restrict the orifice means in the desired degree to increase the pressure differential. An opposite adjustment will be effected upon decrease in specific gravity and such a system can be employed to vary the pressure differential substantially proportionally to the mass flow of fluid.

In Figures 9 and 10 is shown an adjustable-sized orifice means of the sliding-plate type. Here, a plate 80 traverses the passage 31 and is secured to the body 30, this plate providing a rectangular or square opening 81. A control plate 82 provides a V-shaped mouth 83 and is vertically movable to vary the area of the orifice formed cooperatively by the walls of the V-shaped mouth 83 and two walls of the opening 81. The control plate 82 is guided in its vertical movement by clips 84 which retain this member immediately adjacent the plate 80. This guiding is further facilitated by a plunger 85 formed on the upper end of the control plate 82 and sliding in a vertical passageway provided by a block 86 suitably secured to the plate 80. In the upper end of this passageway is a member 87 and two springs 88 may be compressed between this member and the uppermost end of the plunger 85 to exert a slight downward bias on the control plate 82. This bias is adjustable by turning a small screw 89 threaded through the body 30 and engaging the upper face of the member 87 to adjustably determine the vertical position thereof.

The block 86 carries pins 90 and 91 respectively journalling cranks 92 and 93 to which are secured floats 94 and 95. The opposite arms of these cranks provide elongated openings receiving a pin 97 carried by the control plate 82. When the floats rise, in response to an increase in specific gravity, the pin 97 is moved downward to effect a slight motion of the control plate 82 toward closed-orifice position, thus increasing the restriction of the orifice means and varying the pressure differential on opposite sides thereof in a manner which is substantially proportional to the mass flow of fluid.

In the embodiment of Figure 11, the variable orifice means is of the concentric-member type. Here, a plate 100 traverses the passage 31, being connected to the body 30 and providing a circular opening 101. A tapered element 102 is disposed to move substantially axially into and from the opening 101. The fluid-conducting orifice is represented by the annular space between the walls of the opening 101 and the walls of the tapered member 102, the area of this orifice changing with a shift in position of the tapered member 102 in the direction of the double-headed arrow 103. The member 102 may be mounted for straight line or arcuate motion, the latter being illustrated in Figure 11, through mounting of the member on an arm 104 pivoting on a pin 105 retained in a block 106. The arm 104 forms a part of a bell crank, the other arm thereof extending substantially horizontally and being indicated by the numeral 107. A hollow float 108 is attached to this arm 107 and, upon increase in buoyancy, pivots the bell crank against the action of a tension spring 109 in such a way as to move the tapered member 102 a further distance into the opening 101 to restrict the orifice and produce the desirable results outlined above.

It will be clear that the embodiments herein-described have been selected for illustrative purposes only and that various modifications can be made in the details thereof without departing from the spirit of the invention. It will also be apparent that the invention comprehends generally the provision of any one of a number of devices responsive to change in specific gravity, and the operative connection thereof to any one of a number of variable orifice means so as to change the size of this orifice means in a manner correlated with changes in density or specific gravity of the fluid being metered. The constructional details of such elements can be varied widely without departing from the spirit of the invention as defined in the appended claims.

I claim as my invention:

1. In a metering system for measuring the mass rate of flow of a fluid by use of a differential-pressure-responsive meter, a control unit for connection to such a meter, including in combination: passage means in the line of flow of the entire fluid stream to be measured and providing portions of different diameter through which said fluid flows in sequence and at differential velocity to produce a differential pressure which varies with the volume rate of flow of said fluid and which is transmitted to said differential-pressure-responsive meter, said passage means including a diaphragm having an adjustable-area orifice forming one of said portions of different diameter; means for varying the area of said orifice to change the fluid velocity therethrough with respect to the fluid velocity through said other portion; means responsive to changes in density of said fluid; and means for operatively connecting said density-responsive means to said means for varying the area of said diaphragm orifice in a manner to vary said differential pressure transmitted to said meter substantially proportionally to the mass rate of said fluid flowing through said passage means throughout a range of mass rates of flow through said control unit.

2. In a metering system for measuring the mass rate of flow of a fluid by use of a differential-pressure-responsive meter, a control unit for connection to such a meter, including in combination: a diaphragm providing an adjustable-area restricted orifice in the path of flow of said fluid to establish a difference in pressure on opposite sides of said diaphragm; means responsive to changes in density of said fluid for decreasing the area of said restricted orifice of said diaphragm in response to an increase in density of said fluid to increase said differential pressure; and means for transmitting said differential pressure to said meter.

3. In a metering system for measuring the mass rate of flow of liquid by use of a differential-pressure-responsive meter, a control unit for connection to such a meter, including in combination: a body providing a passage for conducting the entire flow of said liquid to be measured; a diaphragm providing an adjustable-area restricted orifice in the path of flow of said liquid along said passage to establish a difference in pressure on opposite sides of said diaphragm, this pressure differential varying with the volume rate of flow of said liquid at a given orifice area and being transmitted to said differential-pressure-responsive meter; gravity-responsive means responsive to changes in specific gravity of said liquid; and means for operatively connecting said gravity-responsive means to said diaphragm to change the size of said restricted orifice in a manner to make said differential pressure transmitted to said meter substantially proportional to the mass rate of said liquid flowing through said orifice throughout a range of mass rates of flow through said control unit.

4. In a metering system for measuring the mass rate of flow of liquid by use of a differential-pressure-responsive meter, a control unit for connection to such a meter, including in combination: a body providing a passage for conducting the entire flow of said liquid to be measured; a diaphragm having orifice-defining elements relatively movable in a direction transverse to the direction of movement of said liquid along said passage to provide an adjustable-area restricted orifice in the path of flow of said liquid along said passage to establish a difference in pressure on opposite sides of said diaphragm, this pressure differential varying with the volume rate of flow of said liquid at a given orifice area and being transmitted to said differential-pressure-responsive meter; a float means in said passage and at least partially submerged in said liquid in said passage to vary in buoyancy with changes in specific gravity of said liquid; and means for operatively connecting said float means to said relatively-movable orifice-defining elements of said diaphragm to vary the size of said orifice with changes in said specific gravity in a manner to make said differential pressure transmitted to said meter substantially proportional to the mass rate of liquid flowing through said orifice throughout a range of mass rates of flow through said control unit.

5. A combination as defined in claim 4, in which said float means is movable and including means for at least partially counterbalancing the weight of said float means.

6. A combination as defined in claim 4, in which said float means is movable and including spring means for biasing said float means toward a lower position, and including means for at least partially counterbalancing the weight of said float means.

7. In a metering system for measuring the mass rate of flow of liquid by use of a differential-pressure-responsive meter, a control unit for connection to such a meter, including in combination: a body providing a passage for conducting the entire flow of said liquid to be measured; an iris diaphragm providing relatively movable blades cooperating in defining an adjustable-area restricted orifice in the path of flow of said liquid along said passage to establish a difference in pressure on opposite sides of said iris diaphragm, this pressure differential varying with the volume rate of flow of said liquid at a given orifice size and being transmitted to said differential-pressure-responsive meter; and means for relatively moving said blades to decrease the area of said orifice in response to an increase in specific gravity of said liquid and to increase the area of said orifice in response to a decrease in specific gravity of said liquid, said means for relatively moving said blades comprising a float means submerged in said liquid at a position adjacent said iris diaphragm and mechanical means for operatively connecting said float means to said blades of said iris diaphragm.

8. In a metering system for measuring the mass rate of flow of liquid by use of a differential-pressure-responsive meter, a control unit for connection to such a meter, including in combination: a body providing a passage for conducting said liquid; relatively movable elements cooperating in defining an adjustable-area restricted orifice means in the path of flow of said liquid along said passage to establish a difference in pressure on opposite sides of said restricted orifice means, this pressure differential varying with the volume rate of flow of said liquid at a given orifice size; a pair of floats submerged in said liquid respectively on opposite sides of said orifice means; and a means operatively connecting said floats to at least one of said elements to effect a relative movement of said elements to vary the size of said orifice means upon increase and decrease in the buoyancy of said floats.

9. A combination as defined in claim 3, in which said gravity-responsive means comprises a float means positioned adjacent and to one side of the periphery of said adjustable-area orifice of said diaphragm to be submerged in a stream of the liquid flowing through said passage.

10. A combination as defined in claim 4, in which said float means is movable in one direction upon increase in specific gravity of said liquid and in an opposite direction upon decrease in specific gravity of said liquid and including means for biasing said float means to move in one of said directions whereby movement of said float means in the other of said directions takes place against the biasing action of said biasing means.

11. In a metering system for measuring the mass rate of flow of liquid by use of a differential-pressure-responsive meter, a control unit for connection to said meter, including in combination: a body defining a passage through which flows the stream of liquid to be measured; an adjustable-area restricted orifice means providing an orifice and disposed in the path of flow of said liquid along said passage, said orifice means traversing said passage to divide same into two chambers communicating with each other through said orifice, said orifice being of substantially smaller size than said passage to provide a liquid-containing annular zone within said chambers around the periphery of said orifice, the flow of fluid through said orifice establishing a pressure differential between said chambers, this pressure differential varying with the volume rate of flow of said liquid at a given orifice area; means for transmitting said pressure differential to said meter; a float in one of said annular zones and submerged in the liquid flowing through the corresponding chamber, said float being disposed between the periphery of said orifice and said body so as not to obstruct the flow of liquid through said orifice, said float being responsive to changes in specific gravity of said liquid; and mechanical means for operatively connecting said float to said adjustable-area orifice means to change the size of said orifice in a manner to make said differential pressure substantially proportional to the mass rate of said liquid flowing through said orifice means throughout a range of mass rate of flow through said control unit.

12. In a metering system for measuring the mass rate of flow of liquid by use of a differential-pressure-responsive meter, a control unit for connection to said meter, including in combination: a body providing a passage for conducting the stream of liquid to be measured; an adjustable-area restricted orifice means providing an orifice in the path of flow of said liquid along said passage to establish a difference in pressure on opposite sides of said restricted orifice means, this pressure differential varying with the volume rate of flow of said liquid at a given orifice area; means for transmitting said pressure differential to said meter; a gravity-responsive float in said passage adjacent said orifice means; means for pivotally mounting said float to turn about a pivot axis substantially parallel with the axis of said passage; and means for mechanically connecting said float to said adjustable-area restricted orifice means to change the area of said restricted orifice in a manner to make said differential pressure transmitted to said meter substantially proportional to the mass rate of liquid flowing through said orifice means.

13. A combination as defined in claim 22, in which said float is disposed on one side of said axis of said passage, and in which said pivot axis is on the other side of said axis of said passage.

14. A combination as defined in claim 12, in which said float is disposed on one side of said axis of said passage and in which said pivot axis is on the other side of said axis of said passage, and said means for pivotally mounting said float includes a ring providing a central opening larger than said orifice, one side of said ring carrying said float and the other side of said ring being pivoted on said pivot axis.

15. A combination as defined in claim 12, in which said float moves up and down while substantially horizontally opposite said pivot axis, and including a counterbalance means on the opposite side of said pivot axis from said float to at least partially counterbalance said float.

16. A combination as defined in claim 12, including a helical spring extending about said pivot axis and operatively connected to said float for biasing said float toward a depressed position.

DONALD K. ALLISON.

Certificate of Correction

Patent No. 2,402,585.  June 25, 1946.

DONALD K. ALLISON

It is hereby certified that errors appear in the printed specification of the above numbered patent requiring correction as follows: Column 5, line 7, for "50" read *60*; column 10, line 59, claim 11, for "rate" read *rates*; column 11, line 10, claim 13, for the claim reference numeral "22" read *12*; and that the said Letters Patent should be read with these corrections therein that the same may conform to the record of the case in the Patent Office.

Signed and sealed this 3rd day of September, A. D. 1946.

[SEAL]

LESLIE FRAZER,
*First Assistant Commissioner of Patents.* pivotally mounting said float to turn about a pivot axis substantially parallel with the axis of said passage; and means for mechanically connecting said float to said adjustable-area restricted orifice means to change the area of said restricted orifice in a manner to make said differential pressure transmitted to said meter substantially proportional to the mass rate of liquid flowing through said orifice means.

13. A combination as defined in claim 22, in which said float is disposed on one side of said axis of said passage, and in which said pivot axis is on the other side of said axis of said passage.

14. A combination as defined in claim 12, in which said float is disposed on one side of said axis of said passage and in which said pivot axis is on the other side of said axis of said passage, and said means for pivotally mounting said float includes a ring providing a central opening larger than said orifice, one side of said ring carrying said float and the other side of said ring being pivoted on said pivot axis.

15. A combination as defined in claim 12, in which said float moves up and down while substantially horizontally opposite said pivot axis, and including a counterbalance means on the opposite side of said pivot axis from said float to at least partially counterbalance said float.

16. A combination as defined in claim 12, including a helical spring extending about said pivot axis and operatively connected to said float for biasing said float toward a depressed position.

DONALD K. ALLISON.

Certificate of Correction

Patent No. 2,402,585.  June 25, 1946.

DONALD K. ALLISON

It is hereby certified that errors appear in the printed specification of the above numbered patent requiring correction as follows: Column 5, line 7, for "50" read *60*; column 10, line 59, claim 11, for "rate" read *rates*; column 11, line 10, claim 13, for the claim reference numeral "22" read *12*; and that the said Letters Patent should be read with these corrections therein that the same may conform to the record of the case in the Patent Office.

Signed and sealed this 3rd day of September, A. D. 1946.

[SEAL]

LESLIE FRAZER,
*First Assistant Commissioner of Patents.*